United States Patent [19]

Jenkins

[11] 4,276,975
[45] Jul. 7, 1981

[54] INCLINATION MAINTAINING SYSTEM FOR A DISCHARGE CHUTE

[76] Inventor: Eugene M. Jenkins, 206 E. Camino Colegio, Santa Maria, Calif. 93454

[21] Appl. No.: 956,648

[22] Filed: Nov. 1, 1978

[51] Int. Cl.³ ............................................ B65G 11/12
[52] U.S. Cl. ...................................... 193/10; 180/41;
 193/17; 298/7; 340/689; 414/700
[58] Field of Search .................. 180/41; 414/708, 699,
 414/700, 542, 543; 318/587, 646, 649; 56/208;
 298/1 R, 7, 17 S; 193/17, 18, 10, 19, 20, 21, 35
 R; 340/685, 689; 364/463; 73/65

[56] References Cited

U.S. PATENT DOCUMENTS

| | | | |
|---|---|---|---|
| 2,503,423 | 4/1950 | Silverman et al. | 318/587 X |
| 2,729,435 | 1/1956 | Harbers et al. | |
| 2,876,921 | 3/1959 | Salna | 414/700 |
| 3,041,111 | 6/1962 | Wyrick, Jr. | |
| 3,277,840 | 10/1966 | Yao-Tzu Li. | |
| 3,640,578 | 2/1972 | Finney. | |
| 3,652,101 | 3/1972 | Pivonka. | |
| 3,916,544 | 11/1975 | Swisher, Jr. et al. | 180/41 X |
| 4,063,628 | 12/1977 | Jenkins. | |

FOREIGN PATENT DOCUMENTS 2139800 2/1973 Fed. Rep. of Germany .......... 414/700

Primary Examiner—Frank E. Werner
Attorney, Agent, or Firm—Huebner & Worrel

[57] ABSTRACT

An inclination maintaining system for a discharge chute of a ready-mix concrete truck or the like including a body on which the chute is pivotally mounted for movement about an axis extending horizontally and transversely of the chute, the system having sensors mounted on the chute for sensing inclination thereof relative to the horizontal about the axis, an extensible and contractible member interconnecting the body and the chute in attitude controlling relation to the chute, and control elements responsive to the sensors for extending and contracting the member so as to maintain the chute at the inclination.

4 Claims, 8 Drawing Figures

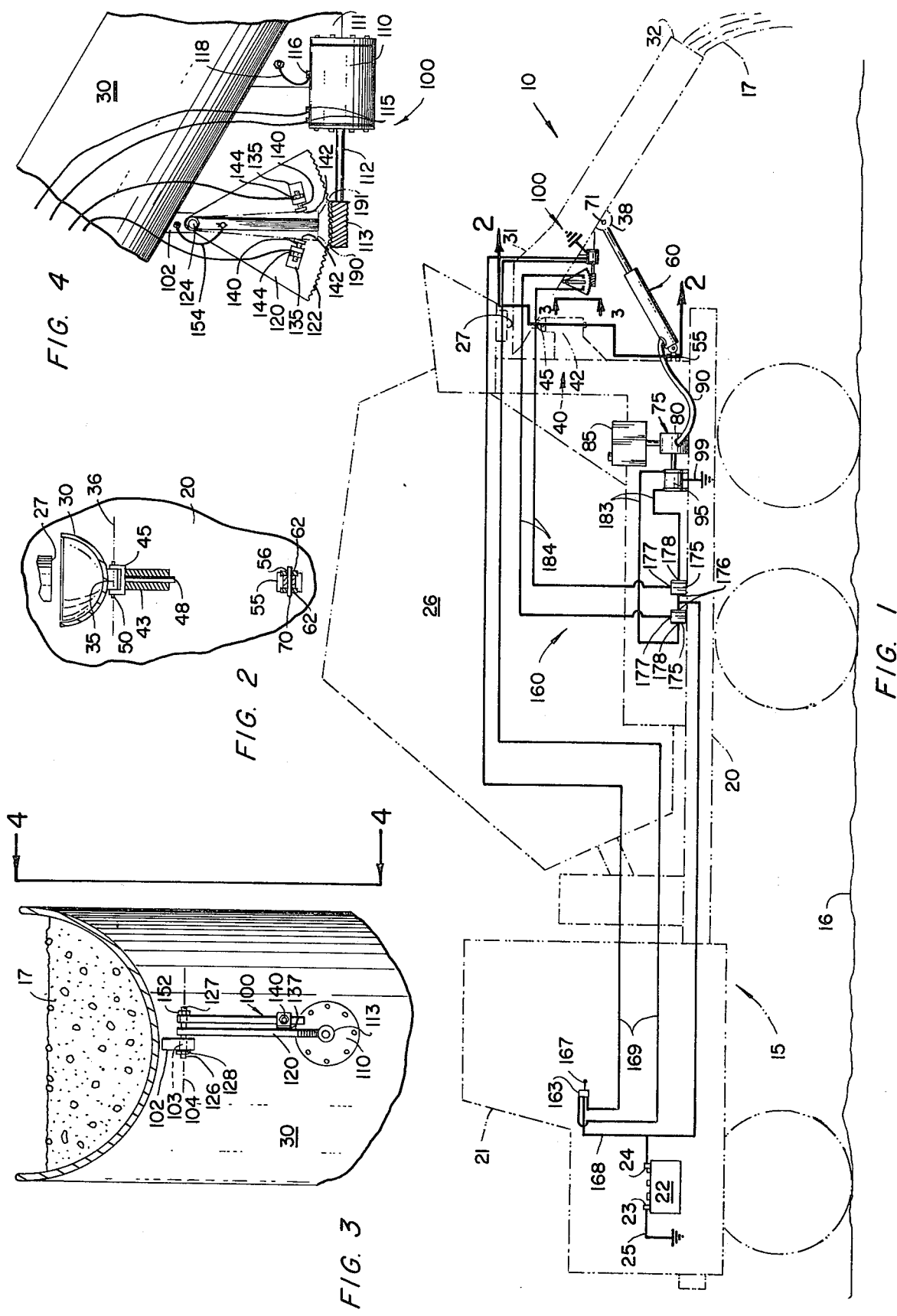

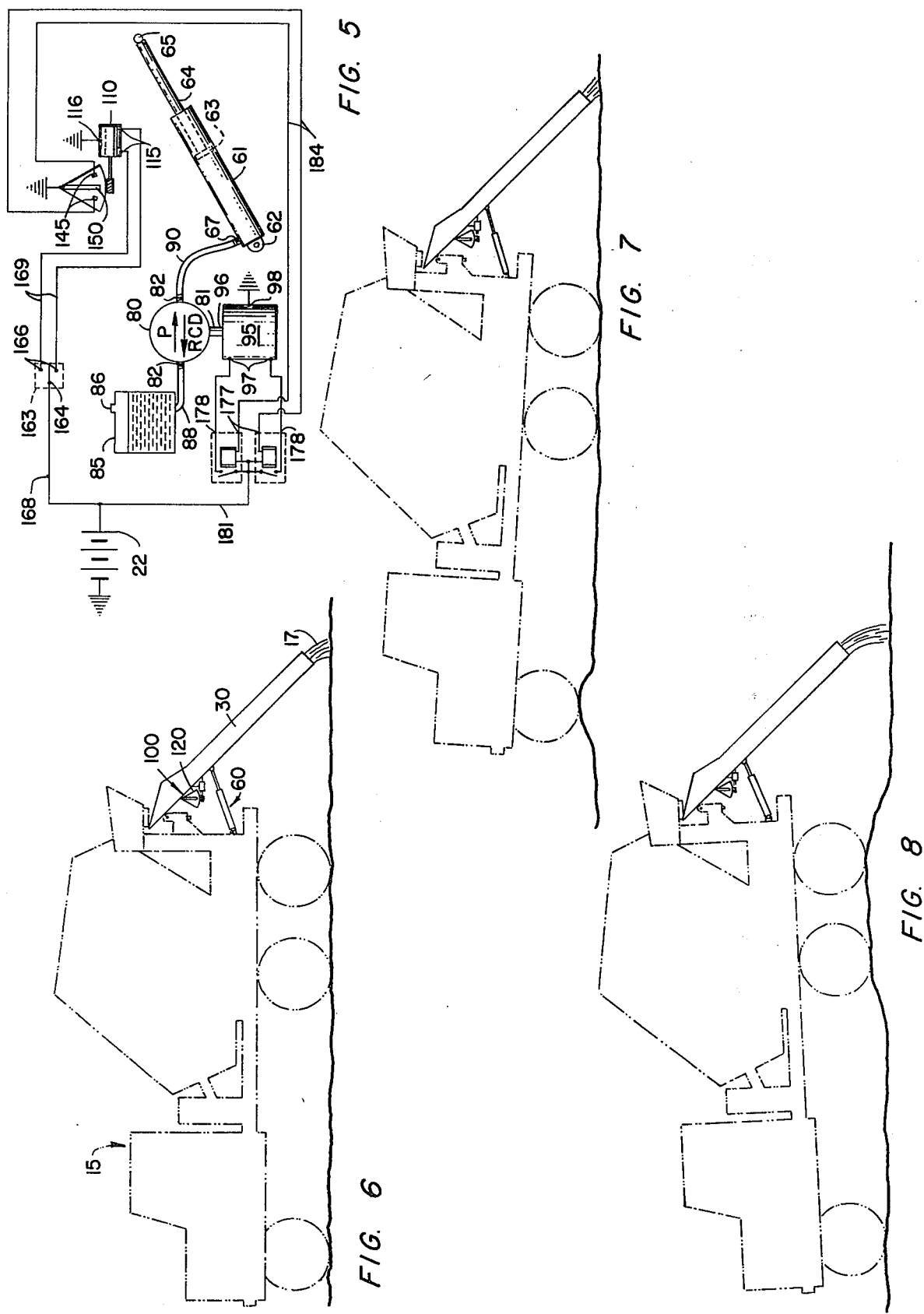

INCLINATION MAINTAINING SYSTEM FOR A DISCHARGE CHUTE

BACKGROUND OF THE INVENTION

1. Field of the Invention

The present invention relates to an inclination maintaining system for a discharge chute, and more particularly to such a system for use with the discharge chute of a ready-mix concrete truck which maintains the chute at a selected inclination as the inclination of the body varies due to movement of the truck over an uneven surface while discharging concrete.

2. Description of the Prior Art

Existing discharge chutes for ready-mix concrete trucks are elongated in the direction of flow therethrough and have one end pivotally mounted on the rearward end of the body of the truck for movement about an axis extending horizontally and transversely of the truck. Such a chute receives concrete in flowable form at its mounting end and discharges the concrete at its distal end. The chute is provided with a hydraulic ram which has opposite ends connected to the body of the truck and to the chute so that extension and contraction of the ram varies the inclination of the chute relative to the body. The ram is connected to a hydraulic system by which the ram selectively is extended and contracted to position the distal end of the chute at a desired elevation above a location at which concrete is to be discharged. Such existing hydraulic systems are manually activated so that the inclination of the chute relative to the body does not change in the absence of manipulation by an operator.

It is frequently necessary to discharge concrete onto a surface along an elongated path of traversal. To distribute the concrete along the path the truck is moved in a forward direction along the path. During such movement over a surface having elevational irregularities, the inclination of the body of the truck to the horizontal varies as the forward and rearward wheels of the truck individually encounter the irregularities. As a result, the inclination of the chute, which is extended rearwardly from the body, varies so that elevation of the distal end of the chute above the location where concrete is being discharged varies correspondingly. As the truck moves over the irregularities, the distal end of the chute often strikes the surface with resulting damage to concrete forms thereon and to the chute. Even if there is no damage, the concrete is distributed irregularly. On the other hand, when the elevation of the distal end becomes great enough, concrete is discharged at unwanted locations, splashed over the surroundings, or otherwise wasted.

The inclination of the chute can be controlled manually with the prior art type of hydraulic system to maintain the inclination of the chute approximately constant during dumping. However, it is necessary to provide an extra man to control the chute since the usual crew is fully occupied during discharge of concrete with driving the truck and distributing the concrete laterally of its path. When an extra man is provided, it is necessary for him to walk beside the truck as it moves during concrete discharge to observe and to adjust the inclination of the chute. This work is inconvenient and often dangerous. Such manual control is, in any event, difficult when the surface over which the truck moves is highly irregular and broken.

As a result of these difficulties, it has long been recognized that it would be highly desirable to provide a system which would automatically and accurately maintain a predetermined inclination of the discharge chute of a ready-mix concrete truck during movement of the truck while pouring concrete.

PRIOR ART STATEMENT

Characterizing the closest prior art of which the applicant is aware and in compliance with 37 C.F.R. § 1.97 and § 1.98, attention is invited to the following patents:

| | | |
|---|---|---|
| Harbers, et al. | 2,729,435 | Jan. 3, 1956 |
| Wyrick, Jr. | 3,041,111 | June 26, 1962 |
| Yao-Tzu Li | 3,277,840 | Oct. 11, 1966 |
| Finney | 3,640,578 | Feb. 8, 1972 |
| Pivonka | 3,652,101 | Mar. 28, 1972 |
| Jenkins (Applicant) | 4,063,628 | Dec. 20, 1977 |

The most pertinent patent listed is that to the present applicant, Jenkins, U.S. Pat. No. 4,063,628, which is thought to be relevant in its disclosure of a hydraulically actuated system with pendulum sensing for leveling transversely swinging movement of a concrete discharge chute. This patent discloses no method or apparatus for selectively varying a desired angle of inclination of the chute.

The patents to Yao-Tsu Li, U.S. Pat. No. 3,277,840; Finney, U.S. Pat. No. 3,640,578; and Pivonka, U.S. Pat. No. 3,652,101 are believed to be relevant in their disclosure of electro-hydraulic systems sensing a level position of an element of a vehicle by a pendulum or a mercury switch. These patents are not concerned with varying the desired position of the element.

The patent to Wyrick, Jr., U.S. Pat. No. 3,041,111, is believed to be relevant in its disclosure of an electrically actuated leveling system for transverse leveling of a truck trailer. However, no inclination sensor or automatic control system is disclosed.

The patent to Harbers, et al, U.S. Pat. No. 2,729,435, is believed relevant in its disclosure of the prior art concrete trucks having a hydraulically elevated discharge chute without automatic control of any sort.

SUMMARY OF THE INVENTION

It is an object of the present invention to provide an inclination maintaining system for a discharge chute of a ready-mix concrete truck or the like which automatically maintains the chute at a selected inclination relative to the horizontal while discharging concrete through the chute during movement of the truck over an irregular and/or inclined surface.

Another object is to provide such a system which reduces the number of persons and the danger involved in discharging concrete under such adverse circumstances.

Another object is to provide such a system which is readily adaptable to existing manually controlled concrete discharge chute elevating systems.

Further objects and advantages are to provide improved elements and arrangements thereof in such a system which is economical, durable and rugged, and fully effective in accomplishing its intended purpose.

BRIEF DESCRIPTION OF THE DRAWINGS

FIG. 1 is a side elevation of a ready-mix concrete transporting truck having a discharge chute provided with an inclination maintaining system embodying the principles of the present invention. The truck is represented by its outline in dot-dashed lines. An electrical control circuit utilized in the inclination maintaining system is shown schematically in FIG. 1.

FIG. 2 is a fragmentary somewhat enlarged, vertical section taken on line 2—2 of FIG. 1 showing the mounting for a concrete discharge chute and a hydraulic ram.

FIG. 3 is a further enlarged section taken on line 3—3 of FIG. 1 of an inclination sensing sub-system utilized with the system of FIG. 1. The sub-system is shown mounted on a fragmentarily represented concrete discharge chute. The control circuit is omitted for clarity.

FIG. 4 is a view of the sub-system and chute of FIG. 3 taken from line 4—4.

FIG. 5 is a schematic diagram of the electric and hydraulic circuits of FIG. 1.

FIG. 6 is a schematic side elevation of the truck and inclination maintaining system of FIG. 1 at a reduced scale with the angle of inclination of a concrete discharge chute varied from the inclination in FIG. 1.

FIG. 7 is a view similar to FIG. 6 showing the operation of the system when the front end of the truck is elevated.

FIG. 8 is a view similar to FIG. 6 showing the operation of the system when the rear end of the truck is elevated.

DESCRIPTION OF THE PREFERRED EMBODIMENT

Referring more particularly to the drawings, in FIG. 1 there is shown an inclination maintaining system for a discharge chute embodying the principles of the present invention. The system is indicated generally by the numeral 10 and is mounted on a ready-mix concrete truck 15 of well-known construction. The truck is adapted for movement over an earth surface 16 where concrete in flowable form is to be poured as indicated by the numeral 17. The truck has a body 20 which includes a cab 21. The body is provided with a source of electrical energy, typically a storage battery 22, which has a negative terminal 23 and a positive terminal 24. The negative terminal is electrically connected to the body by a cable 25. The positive terminal is connected to the control circuit to which subsequent reference will be made. The truck has a transporting and mixing hopper 26 for concrete in flowable form. The hopper has a discharge opening 27 therein disposed at the rearward end of the body. The truck 15 includes a discharge chute 30 of conventional construction mounted on the rearward end of the body 20, as best shown in FIGS. 1 and 2. The chute is elongated in the direction of concrete flow therethrough and has a receiving end 31 and a longitudinally opposite distal end 32. Transversely, the chute is of upwardly open, U-shaped form. The receiving end is provided with an integral, cylindrical sleeve 35 on its lower surface which defines a mounting axis 36 extended substantially horizontally and transversely of the chute. The lower surface of the chute is provided with a downwardly open clevis 38 disposed thereon intermediate its opposite ends.

The truck includes a bracket 40 for mounting the chute 30 on the body 20. The bracket has a stationary portion 42 extending rearwardly from the body to a cylindrical sleeve 43 disposed below the discharge opening 27 of the hopper 26. The axis of the sleeve extends substantially vertically. The bracket includes a movable clevis portion 45 having a pair of transversely opposite bores, not shown. The clevis portion is dimensioned and proportioned to mate with the sleeve 35 of the chute when the bores are aligned axially with the sleeve. This clevis portion has a cylindrical stem 48 extending centrally downwardly therefrom for reception in the sleeve of the stationary portion of the bracket. The chute is, as a result, mounted for pivotal movement about the axis 36 of said sleeve. The chute is secured to the bracket for pivotal movement about the axis by a pin 50 extended through the aligned bores of the clevis portion and of the sleeve 35.

The rearward end of the truck body 15 is provided with a lug 55 pivotally mounted thereon for movement about a substantially vertical axis. The lug has a bore 56 extending therethrough in substantially parallel relation to the chute mounting axis 36.

The inclination maintaining system 10 includes, as shown in FIGS. 1 and 5, an extensible and contractible hydraulic ram 60 of a type well known in the art. The ram has a cylinder 61 bearing a clevis 62 at one of its axial ends. A piston 63 is fitted within the cylinder. A rod 64 extends from the piston oppositely of the clevis and axially outwardly of the cylinder to an end provided with a transverse bore 65. The ram is conveniently of the single-acting type, and the cylinder is provided with a hydraulic connection 67 adjacent to said clevis through which hydraulic fluid is delivered to and returned from the cylinder. The cylinder of the ram is pivotally connected to the lug 55 by a pin 70 inserted through the clevis 62 and the bore 56 of the lug. The rod is pivotally connected to the clevis 38 on the discharge chute 30 by a pin 71 inserted through said clevis and the bore 65 of the rod. The ram thus interconnects the body 20 of the truck 15 and the discharge chute.

The inclination maintaining system 10 includes a hydraulic supply sub-system generally indicated by the numeral 75 and mounted on the body 20 of the truck 15 at one side of the hopper 26. This sub-system is of well-known construction and includes a pump 80 rotationally driven through a shaft 81 and provided with opposite fluid connections 82. The pump is of the reversible constant delivery type and is constructed so that fluid flows therethrough from one of these connections to the other when the shaft is rotated in one direction and flows in the opposite direction between these connections when the shaft rotation is reversed. When the shaft is stationary the pump prevents flow between said connections. A reservoir 85 for hydraulic fluid is mounted on the body 20 above the pump and is provided with a filling orifice 86. The reservoir is connected for fluid flow to one of the connections 82 of the pump by a pipe 88. A flexible hydraulic fluid conduit 90 extends between the other connection 82 of the pump to the connection 67 of the ram 60. This conduit is flexible to allow pivotal movement of the ram relative to the truck body.

The hydraulic supply sub-system 75 includes a reversible electric motor 95, shown in FIGS. 1 and 5, having an output shaft 96. The motor is mounted on the truck body 20 with this shaft in coaxially alignment with the shaft 81 of the hydraulic pump 80. These shafts are connected for reversible rotational drive of the pump by the motor. The motor is of a well-known type and has a pair of electrical supply terminals 97 and a ground terminal 98. The ground terminal is electrically connected to the truck body by a conductor 99. The construction of the motor is such that connection on one of the supply terminals and the ground terminals across a source of electrical energy, such as the battery 22, results in rotation of the motor output shaft in one direction. A similar electrical connection of the other supply terminal and the ground terminal results in rotation of the output shaft in the opposite direction.

The inclination maintaining system 10 includes an inclination sensing sub-system 100, best shown in FIGS. 1, 3, 4 and 5, mounted on the lower surface of the discharge chute 30 toward its receiving end 31. This sub-system includes a first mounting plate 102 which is fixed to the lower surface of the chute and extended downwardly therefrom. A bore 103 extends through the plate adjacent to the chute about a second axis 104 extending substantially parallel to the chute mounting axis 36.

The sensing sub-system 100 includes a reversible electric motor 110 mounted on the chute 30 by a second mounting plate 111. The motor is disposed toward the distal end 32 of the chute from the first mounting plate 102. The motor has an output shaft 112 extending to an end thereof disposed below the bore 103 in the first mounting plate. The motor is mounted so that the shaft extends approximately horizontally when the chute is at the midpoint of its pivotal movement about the first axis 36. Said end of the shaft has a worm gear 113 mounted coaxially thereon for rotation therewith. The motor is of a type similar to the hydraulic pump driving motor 95 in that it has a pair of electrical supply terminals 115 and a ground terminal 116 and is reversed by selective connection of the supply terminals to a source of electrical energy. The ground terminal of the motor 110 is electrically connected to the mounting plate 111 by a flexible electric conductor 118.

The inclination sensing sub-system 100 includes a planar sector 120 mounted on the first mounting plate 102. The sector has an arcuate edge provided with gear teeth 122 configured to mesh with the worm gear 113. A cylindrical pin 124 is fixed to the sector in coaxial alignment therewith. The pin extends perpendicularly through the sector so that the end portions of the pin extend oppositely from the sector. One end portion 126 of the pin is fitted to the bore 103 of the plate for pivotal movement in the bore. The opposite end portion 127 of the pin, therefore, extends from the sector oppositely of said plate. The distal end of said portion of the pin fitted to said bore is extended from the bore oppositely of the sector and is screwthreadably engaged by a nut 128 which secures the sector to the mounting plate. The sector is thus mounted on the chute 30 for pivotal movement about the axis 104 which is parallel to the mounting axis 36 of the chute. The sector is proportioned and dimensioned so that, when so mounted, its gear teeth 122 mesh with the worm gear 103.

The sector 120 has a pair of lugs 135 extending perpendicularly therefrom on its side disposed oppositely from the mounting plate 102. The lugs are disposed on opposite sides of the radial center line of the sector. The lugs are electrically insulated from the sector by a layer 137 of insulating material. The lugs have individual screwthreaded bores, not shown, extended therethrough about axes which are substantially parallel to the plane of the sector and perpendicular to said center line. Each of said bores has an elongated, cylindrical sensor or electrical contact 140 screwthreadably engaged therein. The axial ends of the contact are extended oppositely from the lug. The axial end of the contact disposed toward the center of the sector defines an electrical contact surface 142. The opposite axial end portion of the contact is provided with a lock nut 144 and serves as an electrical terminal 145.

The sensing sub-system 100 includes an elongated pendulum 150 having an upper end pivotally mounted on the end portion 127 of the pin 124 of the sector 120. The pendulum is secured to said end portion by a nut 152 screwthreadably engaged therewith. The pendulum is thus mounted for pivotal movement about an axis coincident with the axis 104 about which the sector is pivotally mounted. This axis, as previously described, is, in turn, parallel to the mounting axis 36 of the discharge chute 30. The pendulum extends downwardly from the pin between the contact surfaces 142 of the electrical contacts 140 so as to be alternately engaged therewith by opposite pivotal movement of the pendulum about the pin. A flexible conductor 154 electrically interconnects the pendulum and the mounting plate 102 providing a ground connection for the pendulum.

The inclination control system 10 includes an electrical sub-system 160 best shown in FIGS. 1 and 5. This sub-system has a chute inclination setting switch 163 mounted remotely from the balance of the system 10 in the cab 21 of the truck 15 for convenient access by an operator of the truck. The switch has a pair of output terminals 166 and a lever 167. When the lever is in a central position, these terminals are electrically disconnected. Movement of the lever to either of two opposite side positions connects the input terminal to a corresponding one of the output terminals. The input terminal is connected by a conductor 168 to the terminal 24 of the battery 22 which is not interconnected to the truck body 20. The output terminals 166 are individually connected by a pair of conductors 169 to the supply terminals 115 of the motor 110 of the sensing sub-system 100. When the lever of the switch is in a central position, said motor is not energized for rotation and the pivotal position of the sector 120 relative to the discharge chute 30 does not change. When the lever is moved to one of its side positions the motor is electrically energized so as rotationally to drive the worm gear 113 in a predetermined direction. This rotation of the worm gear drives the sector in pivotal movement in a corresponding direction about the axis 104 carrying the contacts 140 in simultaneous pivotal movement relative to the chute 30. Similarly, moving the lever to the other side position causes the sector and the contacts to move pivotally in the direction opposite to said predetermined direction.

The electrical sub-system 160 has a pair of substantially identical relays 175 of any suitable form for controlling the relatively large electric current required to energize the motor 95 which drives the hydraulic pump 80. Each relay has an electrical supply terminal 176, an actuating terminal 177, and an output terminal 178. Each relay is constructed so that, when its supply terminal and actuating terminals are connected across a source of electrical energy, the output terminal is connected to the supply terminal and so that disconnection of the actuating terminal disconnects the output terminal from the supply terminal. The battery terminal 24 which is not connected to the body 20 is connected electrically to both of the supply terminals of the relays by a conductor 181. A pair of electrical conductors 183 individually connect the output terminals 178 of the relays with a corresponding supply terminal 97 of said motor. A pair of electrical conductors 184 individually connect the actuating terminals 177 of the relays with a corresponding terminal 145 of the contacts 140 mounted on the sector 120. As a result of these electrical connections, engagement of the pendulum 150 with the contact surface 142 of one of the electrical contacts 140 completes an electrical circuit from the battery 22 through the truck body 20, the discharge chute 30, the mounting plate 102, the flexible conductor 154, the pendulum, said electrical contact, the corresponding conductor 184 and relay 175, and the conductor 181 back to the battery. Said relay is thus energized and electrically connects its output terminal to the battery energizing the pump motor for rotation in a predetermined direction through the corresponding conductor 183 and motor terminal 97. Similarly, engagement of the pendulum with the other contact 140 mounted on the sector 120 results in rotation of the motor in the opposite direction.

The pendulum 150 has a first position, shown in dashed lines in FIG. 4 and indicated by the numeral 190, engaging the one of the electrical contacts 140 mounted on the sector 120 which is disposed toward the receiving end 31 of the chute 30. The electrical connections between the relays 175, said contacts, and the supply terminals 97 of the pump motor 95 are such that when the pendulum assumes said first position the motor is rotationally driven in a predetermined direction such that hydraulic fluid is withdrawn from the ram 60 and returned to the reservoir 85. As a result, the ram contracts due to the weight of the chute and any concrete therein. The pendulum has a second position, shown in dashed lines and indicated by the numeral 191, engaged with the one of said contacts disposed toward the distal end 32 of the chute. When the pendulum assumes its second position the pump is driven in the direction opposite to said predetermined direction. The pump then supplies fluid to the ram causing it to extend. When, as shown in solid lines, the pendulum is disposed between its first and second positions, it engages neither of said contacts so that the motor 95 is not energized and the ram neither extends nor contracts.

It will be seen that the system 10 can be readily installed on an existing ready-mix truck. The system is installed simply by mounting a hydraulic supply sub-system 75, an inclination sensing sub-system 100, and an electrical sub-system 160 on the body of said truck. The existing elements of the truck need not be disturbed and its existing hydraulic ram 60 can be utilized.

OPERATION

The operation of the described embodiment of the subject invention is believed to be clearly apparent and is briefly summarized at this point. To utilize the inclination maintaining system 10 embodying the present invention, a ready-mix truck 15 equipped with the system is driven to the site of an earth surface 16 on which concrete in flowable form is to be poured from the moving truck. For illustrative purposes it is assumed that the pouring is to occur directly on the earth surface as would be done in pouring a sidewalk or the like. At the site, the discharge chute 30 is swung transversely on its bracket 40 about the axis of the sleeve 43 thereof and the stem 48 to align the distal end 32 of the chute with the point at which pouring is to begin.

It is desirable to position the distal end 32 of the chute 30 as close vertically as possible to the earth surface 16 so that concrete will not be splashed over the surroundings or otherwise wasted and so that the concrete can be poured at the precise location desired. The permissible vertical distance between the distal end of the chute and the surface is, of course, dependent on factors such as irregularities in the surface, the presence of forms for the concrete, and the thickness of the concrete after pouring.

An operator of the truck 15 sets this distance initially by manipulation of the switch 163 in the cab 21 of the truck. If, for example, this distance as depicted in FIG. 1 is too great, the lever 167 of the switch is moved from its center-off position to its side position which energizes the motor 110 for rotation in the direction which results in pivoting of the sector 120 toward the distal end 32 of the chute 30. Initially, the pendulum 150 extends downwardly from its mounting pin 124 centrally between the contacts 140 as best shown in FIG. 3. However, as the sector pivots, the pendulum is gravitationally motivated to pivot about the axis 104 so as to remain in a vertical attitude until it assumes its first position 190 shown in FIG. 4. When the pendulum assumes this position, the inclination maintaining system 10 operates, as previously described, to contract the hydraulic ram 60. This contraction pivots the chute 30 about its mounting axis 36 so as to increase its angle of inclination relative to the horizontal and bring its distal end closer to the earth surface as shown in FIG. 6. As the ram contracts and this inclination increases, the sector moves with the chute until the pendulum is gravitationally motivated to swing away from its first position causing contraction of the ram to cease. Conversely, if the distal end of the chute is positioned a greater distance above the earth surface than is desired, the lever 167 of the switch 163 is moved to its position which results in the sector being pivoted toward the receiving end 31 of the chute until the pendulum assumes its second position 191. The ram then extends, decreasing the inclination of the chute relative to the horizontal and moving the distal end of the chute away from the earth surface.

It will be understood that the sector 120 can be pivoted about its axis 104 to any selected position in a range of positions relative to the discharge chute 30. This is done by energizing the motor 110 for rotation in the appropriate direction for a length of time sufficient to move the sector pivotally to the selected position. As the sector moves, the contacts 140 are carried with it so that, in effect, the first position 190 and the second position 191 in which the pendulum 150 engages the contact surfaces 142 are varied relative to the chute. This variation of these positions correspondingly varies the predetermined angle of inclination of the chute 30 relative to the horizontal about its mounting axis 36.

When the discharge chute 30 is positioned at the desired predetermined angle of inclination, the truck 15 is driven in a forward direction to distribute the concrete in flowable form as it is discharged from the hopper opening 26 into the chute and poured from the distal end 32 thereof as indicated by the numeral 17. When the truck is driven so as to encounter an irregularity in the earth surface 16 such that the body of the truck is inclined with its front end elevated relative to its rear end the truck assumes a position depicted in FIG. 7. In this position the inclination maintaining system 10 causes the ram 60 to extend so that the inclination of the chute relative to the horizontal is maintained at the desired angle. This extension of the ram results when one of the contacts 140 disposed toward the distal end of the chute, in effect, senses that such angle of inclination is greater than the desired angle when the pendulum 150 assumes its second position 191 and engages said contact.

If the truck 15 were not provided with the inclination maintaining system 10, when the front end of the truck became elevated above its rear end, the chute 30 would be inclined so that its distal end 32 would approach or even strike the earth surface 16 with resulting danger to persons nearby, to forms for the concrete being poured, and, if the chute were to strike an object with sufficient violence, to the chute and truck.

If, while moving to pour concrete 17, a ready-mix truck 15 encounters an irregularity causing its rear end to become elevated above its front end, the elevation of the distal end 32 of the chute 30 would increase. The concrete would then have to fall a substantial distance resulting in the concrete being splashed over the surroundings and otherwise being improperly placed. However, as shown in FIG. 8, in a truck equipped with the system 10, when the angle of inclination of the chute becomes less than the desired predetermined angle, the pendulum 150 is gravitationally motivated into its first position 190 engaging the one of the contacts 140 disposed toward the receiving end 31 of the chute. This contact senses this position of the pendulum corresponding to a difference in the angle of the chute from the desired angle so that the system causes the hydraulic ram 60 to contract as previously described. This contraction increases the angle of inclination until the inclination sensing sub-system 100 senses that the angle is again equal to its desired predetermined value.

When pouring concrete 17 from the truck 15 while the truck is moving, the system 10 maintains the chute 30 at a predetermined angle of inclination as the angle of inclination of the body 20 of the truck varies due to irregularities in the earth surface 16 encountered as the truck moves during the pouring. This angle cannot only be preselected before pouring is initiated, but if conditions change as pouring progresses, can be varied as desired by the operator of the truck as it moves while pouring continues. Since the desied angle is maintained automatically, the size of the crew required for such pouring is reduced in number, the danger to persons and property is greatly reduced, and the crew can devote their attention to proper placing of the concrete.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. For use with a truck for transporting ready-mix concrete or the like including a body and an elongated discharge chute having a receiving end pivotally mounted on the body for movement about a mounting axis extending substantially horizontally and transversely of the chute and a distal end, an inclination maintaning system for said chute comprising:
   A. contractible and extensible powered means having opposite ends connected to said chute and to said body,
   B. a mass movably mounted on the chute for gravitational motivation between a first position when the chute is pivoted about said mounting axis so that the longitudinal axis of the chute has an inclination to the horizontal less than a predetermined angle and a second position when the chute is pivoted so that said inclination is greater than said predetermined angle, the first and second positions of the mass being individually defined by a pair of sensors disposed on opposite sides of the mass along the longitudinal axis of the chute,
   C. means pivotally mounting the sensors on the chute for corresponding movement about an axis substantially parallel to the mounting axis of the chute,
   D. a powered, reversible, remotely controlled drive connected to the sensor mounting means for simultaneously moving the sensors pivotally about their axis to adjust said predetermined angle, and
   E. control means responsive to movement of the mass for contracting said contractible and extensible means when the mass is in the first position and for extending said contractible and extensible means when the mass is in the second position so that said inclination of the chute is maintained substantially at said predetermined angle.

2. An inclination maintaining system for use with a truck for transporting ready-mix concrete or the like having a discharge chute which is elongated in the direction of flow therethrough and has a receiving end pivotally mounted on the truck for movement about a mounting axis extending substantially horizontally and transversely of the chute and an opposite distal end, the system comprising:
   A. an extensible and contractible hydraulic ram having opposite ends connected to the body and to the chute intermediate opposite ends thereof,
   B. a pendulum mounted on the chute for movement about an axis substantially parallel to said chute mounting axis,
   C. a pair of electrical contacts spaced longitudinally of the chute on opposite sides of the pendulum for individual engagement therewith when the inclination of the chute relative to the horizontal increases and decreases from a predetermined angle,
   D. means mounting the contacts on the chute for simultaneous adjustable movement about an axis substantially parallel to the chute mounting axis,
   E. remotely controlled, reversible drive means for selectively pivoting said contact mounting means together when said contacts in opposite directions about the contact mounting axis so as to determine said angle of inclination, and
   F. hydraulic control means responsive to the engagement of said contacts by the pendulum for extending the ram when said inclination of the chute to the horizontal is greater than said predetermined angle and for contracting the ram when said inclination is less than said angle.

3. The inclination maintaining system of claim 2 wherein the mounting axes of the pendulum and of the contact mounting means are coincident.

4. The inclination maintaining system of claim 2 wherein the means for mounting the contacts comprises a sector pivotally mounted on the chute coaxially with said contact mounting axis, the pendulum is mounted on the sector, and said drive means pivotally positions the sector about said axis.

* * * * *